Oct. 1, 1929.  C. T. PFLUEGER  1,730,333
FISH LURE
Filed Aug. 11, 1926
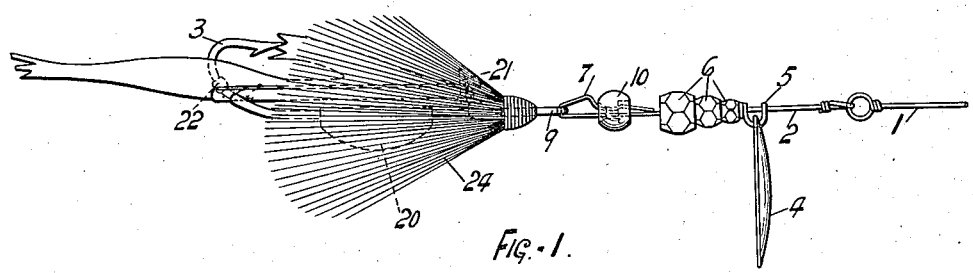
Fig.-1.
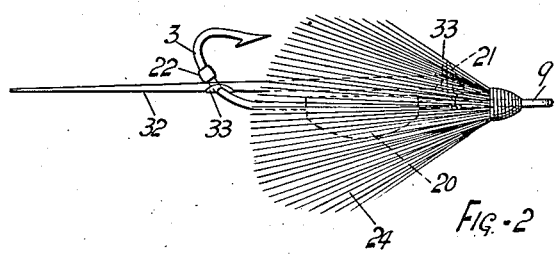
Fig.-2
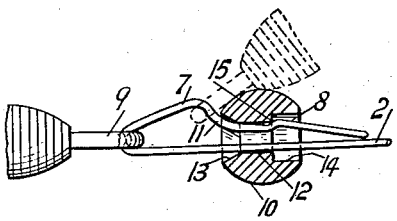
Fig.-3
INVENTOR.
CHARLES T. PFLUEGER
BY 
ATTORNEY.

Patented Oct. 1, 1929

1,730,333

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISH LURE

Application filed August 11, 1926. Serial No. 128,567.

This invention relates to fishing tackle and particularly to the construction of hooks and lures.

One of the objects of the invention is to improve upon present methods of securing hooks to the leaders or lines to obtain a strong fastener which will securely hold the hook to the line or leader and which will prevent entanglement of the hook and bait with the line or other portion of the fishing tackle, accidental entanglement of the hook with the line interferring with successful casting.

In the drawings, in which several forms of the invention are shown as illustrative thereof, Figure 1 is an assembly view of the lure with a strip of material in the form to simulate a frog;

Figure 2 is a view of the hook with a different form of bait simulating pork rind;

Figure 3 is an enlarged view of the hook fastener in section.

In the drawings, the numeral 1 represents the end of the line and 2 the wire leader or carrier to which the hook 3 is attached. Along the leader is carried a freely revolving spinner blade 4 supported upon a rotatable eye 5, and also carried by the leader are a plurality of loose beads 6 of glass or similar material, the spinner and the beads being movable along the leader. The end of the leader is bent backwardly to form a loop 7 which lies along the leader, the end of the loop being formed with a hump or bent portion 8 and a secondary hump or bend 11 for the purposes to be described.

The end of the hook is formed with an eye 9 which is received over the loop 7. The loop is maintained in closed position by a sliding locking member or bead 10 (Figures 1 and 3), the interior of which is formed with a restricted opening 12, a tapering mouth 13 and an enlarged cavity 14 which forms a shoulder 15 in the bead. When the hook is to be detached and a new hook put in its place, the bead 10 is forced over the hump 8 to free the end thereof, and after the new hook is put in position on the loop the bead is forced downwardly until it passes the hump 8 and against the secondary bend 11 and, the leader being formed of a spring wire, the loop will return to its position with the hump 8 at the rear of the shoulder, thereby securely locking the hook in position. The bend 11 operates as a stop for the bead. The rounded surface of the locking bead operates as a means for preventing the hook reversing its position so as to become entangled with the leader or line, as shown in dotted lines in Figure 3.

The locking element or bead affords a simple and secure fastening means for the hook and at the same time prevents excessive angular movement of the hook about the loop in the leader. This locking element is preferably made of a reflecting metal so as to add to the attractiveness of the bait.

The hook 3 is formed with a sinker or weight 20 at about its central portion, which sinker depends below the hook body and serves as a keel to keep the point of the hook upright in the water. This enables the hook to pass over weeds and other obstructions in the water without fouling them. The body of the hook above the keel is provided with a short, supplementary bait-holding hook 21 and at about the curved portion of the hook is formed a bead or stop 22. The hook is thus adapted to carry a flat strip of pork rind or the like, the upper end being impaled upon the hook 21 and the central portion being passed over the curved portion of the hook and over the stop 22. These elements on the hook serve to keep the bait parallel to the hook. The end of the bait trails along behind the hook. A bucktail or similar lure 24 is attached to the hook, preferably near the eye thereof, and conceals the upper portion thereof.

The invention shown and described has many advantages over prior forms of this type. The locking device, in conjunction with the loop fastener, affords an easy, quickly detachable securing means for the hook at the end of the leader, at the same time preventing cocking or fouling of the hook with the line or balance of the bait. Other modifications of the locking device may be made within the scope of the invention.

Other changes and modifications will suggest themselves to those skilled in this art, and such changes as fall within the scope of the invention as set forth in the claims are intended to be covered herein.

What is claimed is:

1. A fish hook comprising a hook proper and a spring wire leader, the end of the wire being bent upon itself to form a loop, the hook being received upon the loop, a hump near the end of the wire, and a sliding locking member movable over the leader and having a restricted axial opening through which the hump may pass, the member being located adjacent the hook and operating as a limit upon the angular movement of the hook.

2. A fish hook comprising a hook proper and a spring wire leader, the end of the wire being turned backwardly to form a loop for the reception of the hook, an apertured spherical bead slidable over the wire and having a shoulder formed therein, and a projection upon the wire movable through the aperture in the bead and against the shoulder.

3. A fish hook comprising a hook proper and a spring wire leader, the end of the wire being turned backwardly to form a loop for the reception of the hook, a locking member slidable over the wire and having a shoulder formed thereon, and a projection upon the wire movable through an axially located aperture in the locking member and resting against the shoulder to secure the locking member and hook in place.

4. A fish hook comprising a hook proper and a spring wire leader, the end of the wire being turned backwardly to form a loop for the reception of the hook, an apertured locking member slidable over the wire and having a shoulder formed thereon at the rear of the aperture, and a projection upon the wire movable through the aperture in the locking member and resting against the shoulder to secure the locking member and hook in place, the body of the locking member affording a stop to limit angular movement of the hook.

CHARLES T. PFLUEGER.